No. 787,788. PATENTED APR. 18, 1905.
C. PINARD.
CLUTCH DEVICE.
APPLICATION FILED DEC. 23, 1902.

WITNESSES
F. W. Wright
Walter Abbr

INVENTOR
Claude Pinard
BY
Howson and Howson
ATTORNEYS

No. 787,788. Patented April 18, 1905.

UNITED STATES PATENT OFFICE.

CLAUDE PINARD, OF CHALON-SUR-SAÔNE, FRANCE, ASSIGNOR TO THE FIRM OF COMPAGNIE INTERNATIONALE DE L'ELECTRO-TYPOGRAPHE MERAY ET ROZAR, OF PARIS, FRANCE.

CLUTCH DEVICE.

SPECIFICATION forming part of Letters Patent No. 787,788, dated April 18, 1905.

Application filed December 23, 1902. Serial No. 136,377.

*To all whom it may concern:*

Be it known that I, CLAUDE PINARD, engineer, a citizen of the French Republic, residing at Chalon-sur-Saône, Department of Saône-et-Loire, Republic of France, have invented a certain new and useful Clutch Device, of which the following is a full, clear, and exact description, and for which I have applied for Letters Patent in France, dated June 11, 1902; in Russia November 9; in Germany November 18; in Italy November 19; in Austria November 21; in Hungary November 22; in Portugal November 25, and in Great Britain December 3.

The object of this invention is to provide an automatic clutch which will prevent a shaft from being rotated by any means except the proper driving means from which it should derive motion.

Figure 1:
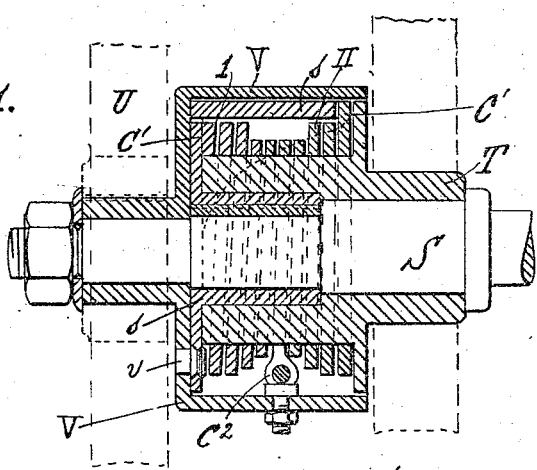
Figure 2:
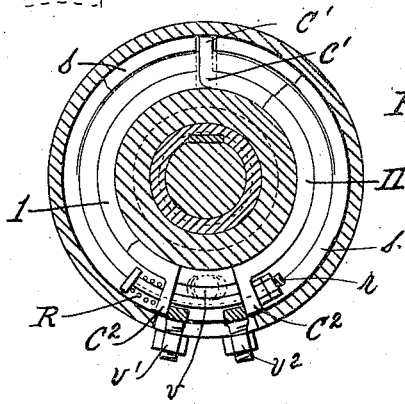
Figure 3:
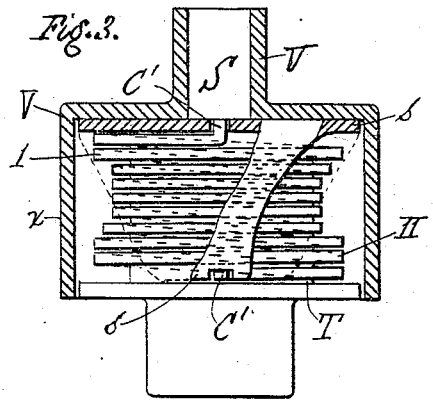

In the accompanying drawings, Figure 1 is a longitudinal sectional view of my improved clutch mechanism. Fig. 2 is a transverse section at right angles thereto, and Fig. 3 is a plan view with parts broken away.

The dotted lines U, Fig. 1, represent the crank or fly wheel (actuated from any source of power) keyed onto a flanged bushing and casing V on the shaft S, which turns in a stationary bearing T, provided with a drum friction-surface. A second flanged bushing $s$ is keyed onto the shaft S, its flange having an elongated slot engaged by a stud $v$ in the flange of the bushing V. The stud has a limited motion in the arc of the slot.

Two helices $C'$ and $C'$ of large cross-section at one end and of small cross-section at their other ends are placed so as to surround the drum of the bearing T with their small ends adjacent, such ends being turned over at $C^2$ $C^2$ and yieldingly united by a rod $r$ and spring R. The larger ends of the helices are united with each other, each being secured to the flange of the bushing $s$. The right-hand helix is secured by means of the extension $x$ of said bushing which engages the helix, while the left-hand helix is directly connected to the flange. In a slot in a part of the bushing $s$ immediately beneath the small ends of the helices I bolt two studs $v'$ $v^2$, (see Fig. 2,) their inner ends abutting against the ends of the helices.

In operation suppose the casing $s$ and studs $v'$ $v^2$ to be moved clockwise the stud $v'$ first forces the helix No. I to the left free of the drum and maintains it thus free so long as the stud presses against the limiting-wall of the slot. The helix No. II is drawn along, tending if friction occur between it and the drum to back up and free itself of the drum. In the opposite direction of rotation the same is true; but the functions of the respective helices are reversed.

Should one attempt to move the shaft S in either direction, (say clockwise, Fig. 2,) the helix No. II will be pushed free of the drum; but the helix No. I will be dragged along the surface of the drum, to which it will cling as would a whip-lash, because of its peculiar varying cross-section and because of the spring R, which tends to hold one end back. The helix which so operates to clutch the drum varies according to the direction of motion endeavored to be imparted to the shaft S. It will thus be seen that the clutch prevents movements of the shaft by power exerted upon the shaft itself, but does not prevent rotation of the shaft by its proper operating means which acts upon the shaft through the helices.

I claim as my invention—

A rotating shaft, a fixed concentric bearing therefor, a casing adapted to turn to a limited extent on said shaft, and means for revolving the casing and shaft, a bushing $s$ keyed to the shaft, a pair of helices having flexible ends, and a spring connecting them, their other ends being secured to the bushing $s$, and a stud in the casing adapted to move one of said flexible ends, whereby one helix is caused to disengage the bearing during the limited motion herein referred to in advance of the motion of the shaft.

In testimony whereof I have signed my name to this specification in the presence of two subscribing witnesses.

CLAUDE PINARD.

Witnesses:
GUSTAVE DUMONT,
EDWARD P. MacLEAN.